United States Patent [19]
Linse et al.

[11] Patent Number: 5,862,635
[45] Date of Patent: Jan. 26, 1999

[54] SUPPORT SYSTEM FOR A BUILDING STRUCTURE

[75] Inventors: Robert P. Linse; Duane H. Otten, both of Cottage Grove, Oreg.

[73] Assignee: Magnum Foundation Systems, Cottage Grove, Oreg.

[21] Appl. No.: 931,245

[22] Filed: Sep. 16, 1997

[51] Int. Cl.⁶ ........................................... E04B 9/00
[52] U.S. Cl. .................... 52/126.6; 52/126.7; 248/354.3; 248/354.5
[58] Field of Search ................. 52/126.6, 126.7, 52/262, 263; 248/354.3, 354.4, 354.5, 188.5

[56] References Cited

U.S. PATENT DOCUMENTS

| | | |
|---|---|---|
| 2,625,815 | 1/1953 | Black . |
| 3,371,902 | 3/1968 | Hartwick . |
| 3,606,704 | 9/1971 | Denton . |
| 3,655,161 | 4/1972 | Schueler ........................... 248/354.5 X |
| 3,713,259 | 1/1973 | Tkach . |
| 3,870,278 | 3/1975 | Lee ................................... 248/354.3 X |
| 4,417,426 | 11/1983 | Meng . |
| 4,546,581 | 10/1985 | Gustafson . |
| 4,562,673 | 1/1986 | Barari . |
| 4,761,924 | 8/1988 | Gustafson . |
| 4,866,797 | 9/1989 | Vollan . |
| 5,363,610 | 11/1994 | Thomas et al. . |
| 5,509,237 | 4/1996 | Coulter . |
| 5,515,655 | 5/1996 | Hoffmann . |
| 5,595,366 | 1/1997 | Cusimano et al. . |

Primary Examiner—Creighton Smith
Attorney, Agent, or Firm—Banner & Witcoff, Ltd.

[57] ABSTRACT

A support stand for securing a manufactured building to a foundation. The stand includes a stepwise mechanism for incrementally adjusting the height of the manufactured building relative to its foundation. The stand also includes a height adjustment mechanism for adjusting the height of the manufactured building relative to its foundation within the increments of the stepwise adjusting mechanism. These mechanisms provide the stand with both macro and micro height adjustment capabilities.

10 Claims, 6 Drawing Sheets

SUPPORT SYSTEM FOR A BUILDING STRUCTURE

FIELD OF THE INVENTION

The present invention relates to an adjustable height support system for securing a manufactured building structure to a foundation, particularly to resist seismic activity and wind forces.

BACKGROUND OF THE INVENTION

Manufactured buildings including mobile homes and modular housing are traditionally built upon a frame containing two or more longitudinal members and several transverse beams. Support systems for these buildings typically include concrete blocks or a plurality of support stands placed under the frame for supporting it and securing it to a foundation. Many conventional support systems are ineffective against the lateral forces created by seismic activities and heavy winds. As a result, these forces can move a manufactured building horizontally off its supports, thereby damaging its structure and utility connections.

Conventional support stands typically include a height adjustment mechanism for leveling the building relative to its foundation. An example of such a stand is disclosed in U.S. Pat. No. 5,152,108, to Madl, Jr. The disclosed stand includes a two stage vertical adjustment for a building. The first stage is a bolt through, incremental adjustment stage and the second is a screwed, fine adjustment stage. The head of a bolt used for the fine adjustment stage is contained within a channel which extends under a building frame clamping assembly. The channel does not assist during lifting of the building, instead the forces generated during the raising and lowering of the building are carried by the bolt. Because the bolt includes a pair of flat surfaces machined along its sides and a through bore, all of which reduce the strength of the bolt, the bolt will not be able to support the building during repetitive height adjustments over an extended period of time.

U.S. Pat. No. 5,515,655, to Hoffmann, discloses an adjustable, telescoping structural support system secured to the frame of a manufactured home. The system includes first and second cylindrical members telescopically engaged with one another. Each member has a plurality of holes spaced about its periphery for receiving a through bolt to establish the height of the house with respect to the ground. The system does not provide for height adjustments between the intervals established by the holes in the side walls of each cylindrical member.

U.S. Pat. No. 3,713,259, to Tkach, discloses a combination anchor and support used to secure a mobile home to an underlying foundation. The combination anchor and support includes a housing that receives a threaded bolt for adjusting the height of the mobile home relative to the foundation. Such a manner for adjusting the height of a mobile home can be difficult and time consuming because large adjustments in height can only be achieved by extensively rotating the bolt.

U.S. Pat. No. 5,509,237, to Coulter, discloses a device for anchoring a mobile home in a position above the ground. The height of the mobile home relative to the ground can be adjusted by rotating a pair of internally threaded nuts about a threaded rod. This manner of height adjustment can be difficult and time consuming because large height adjustments can only be achieved by extensive rotation of the nuts about the threaded rod.

There is a decided need in the art for a support system for manufactured buildings having at least one support stand which effectively anchors the building during earthquakes and heavy winds, and provides easy, fast and reliable height adjustment for leveling the building with its foundation over an extended period of time.

SUMMARY OF THE INVENTION

The foundation support system according to the present invention resists seismic actions and wind force loads experienced by manufactured buildings. The system includes a plurality of support stands and a plurality of bracing members extending between respective pairs of these support stands. Each support stand comprises a clamping assembly for receiving and supporting a frame of the manufactured building and a channel member including an inner floor extending under the clamping assembly. Each support stand also comprises a base for securing the support stand to the foundation, a stepwise height adjusting mechanism for incrementally varying the height of the manufactured building relative to the foundation, and a fine height adjusting mechanism for varying the height of the manufactured building relative to the foundation within the increments of the stepwise adjustment mechanism. The fine height adjustment mechanism includes a support member located within the channel member between an underside of the clamping assembly and the inner floor of the channel member.

According to the present invention, the stepwise height adjusting mechanism comprises a plurality of telescopic members including inner and outer members. One of these telescopic members includes sidewalls having a plurality of apertures extending therethrough and the other telescopic member includes a pair of holes for aligning with the plurality of apertures in the first telescopic member. The stepwise adjustment mechanism also includes a locking member for extending through aligned apertures in the telescopic members when the manufactured building is at a desired height above the foundation.

The fine height adjusting mechanism, according to the present invention, includes a threaded member having a first end including a support member located within the channel between an underside of the support surface and the inner floor of the channel; a bushing located between the support member and the inner floor of the channel for spacing the support member from the channel floor; a receiving member operatively attached to the base and receiving a second end of the threaded member; and a tool engaging member supporting an underside of the channel and being secured to the threaded member for turning the threaded member relative to the receiving member, thereby adjusting the height of the building.

For a better understanding of the invention and its advantages, reference should be made to the accompanying drawings and descriptive matter that illustrate and describe the preferred embodiments of the invention.

DETAILED DESCRIPTION OF THE PREFERRED EMBODIMENT

Figure 1:
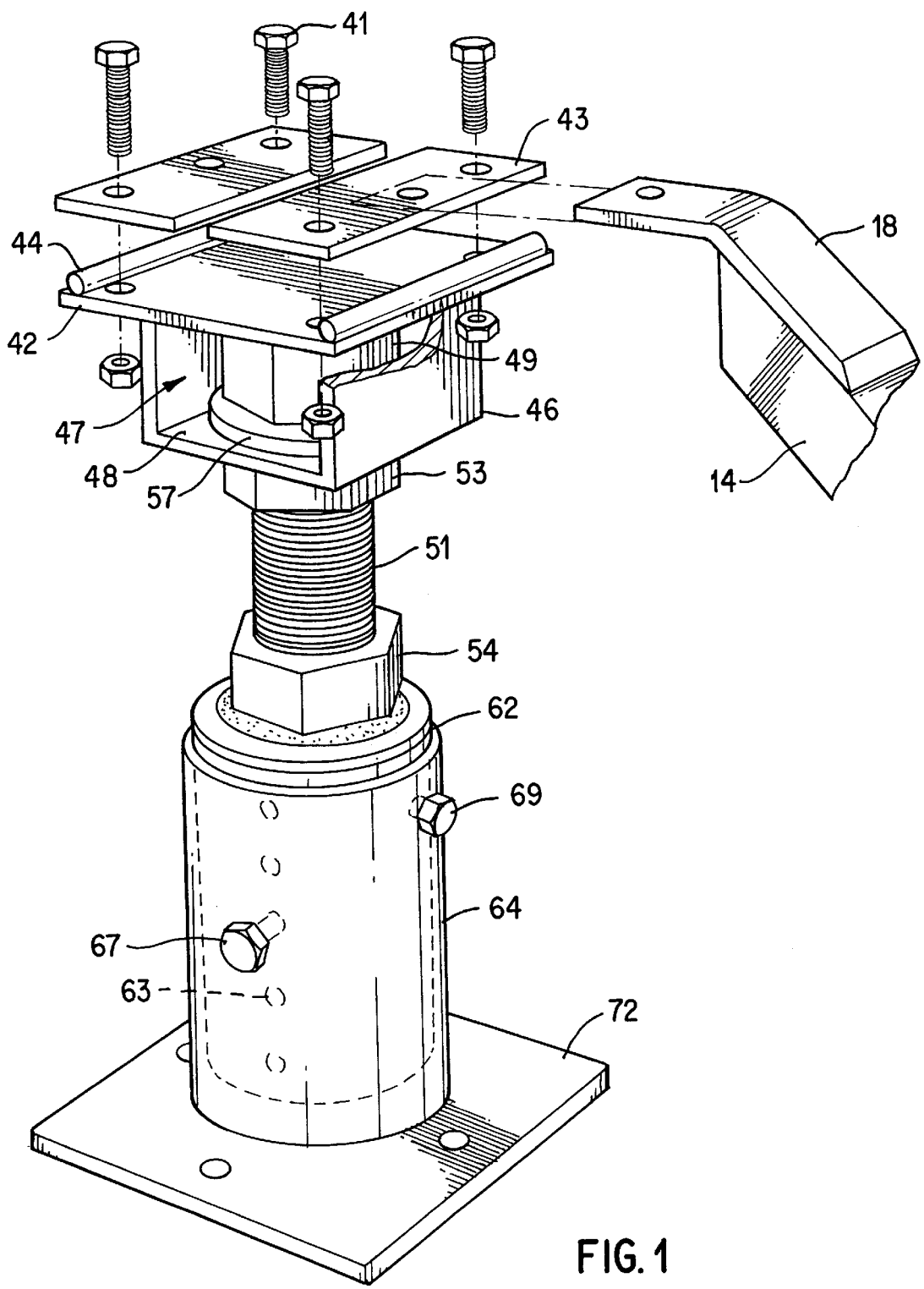
FIG. 1 is a partially broken away and partially exploded perspective view of a support stand according to the present invention.
Figure 2:
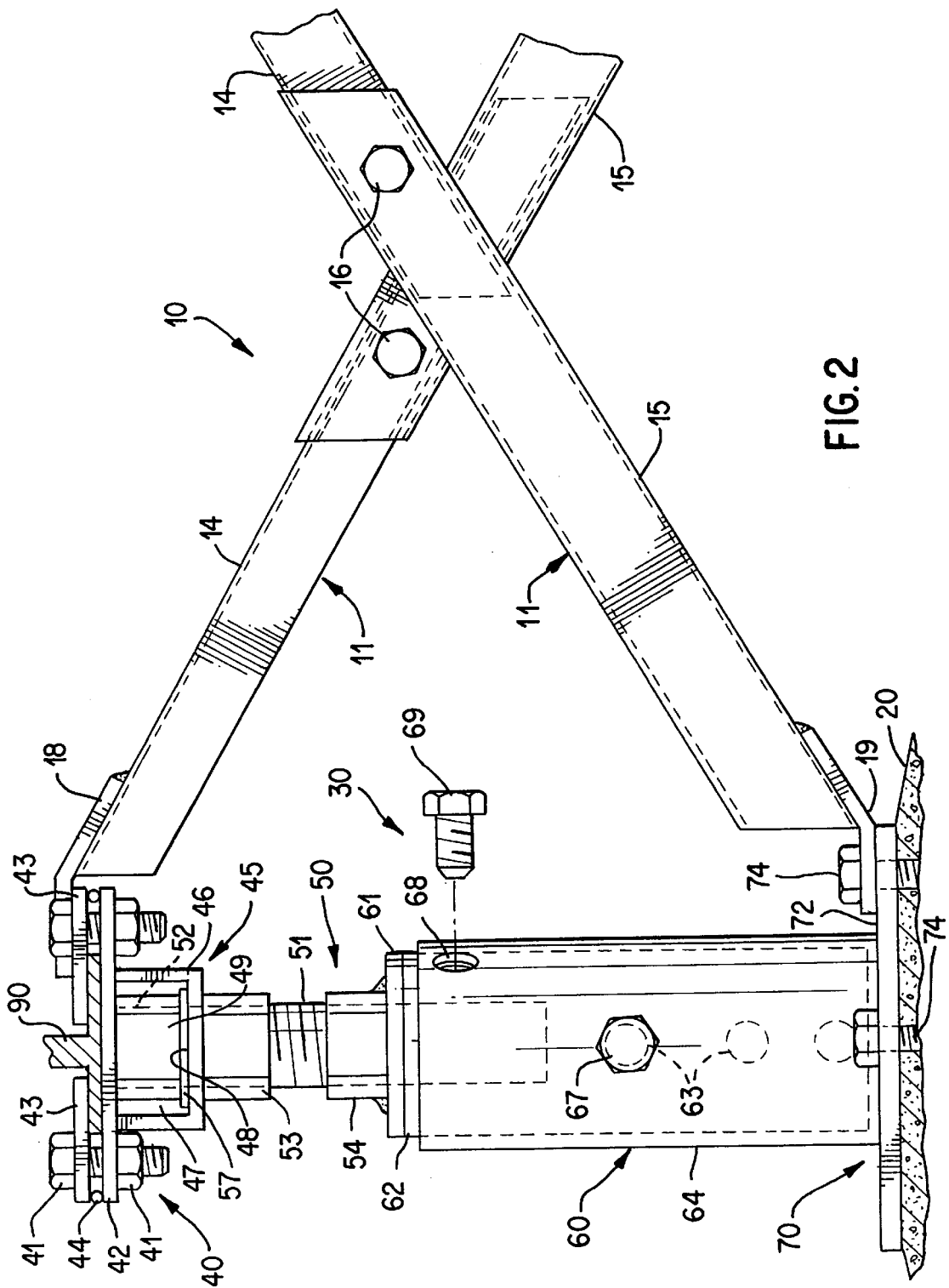
FIG. 2 is a side elevational view of a support stand and cross bracing in accordance with the present invention.

FIG. 1 illustrates a support system 10 for a manufactured building. The building is generally constructed and assembled with an under structure frame of I-beams 90 in a factory and delivered to a particular site for placement upon the support system 10 and a foundation pad 20. The support system 10 includes a plurality of cross braces 11, longitudinal braces 17 and support stands 30. Preferably, the support stands 30 are spaced approximately 10 and 12 feet apart, depending on the under structure of the building. Each cross brace 11 includes telescopic first and second cross bracing members 14, 15 which extend between cooperating support stands 30. Each longitudinal bracing member 17 extends between its respective support stand 30 and a frame clamp 80 secured to the frame, "I" beam, of the building. Traditionally, the number and placement of the stands 30 are dictated by the local building codes.

A first end of each first bracing member 14 is secured to its respective support stand 30 by a flat steel bar or steel strap 18. A first end of each second bracing member 15 is secured to a separate, cooperating support stand 30 by a flat steel bar or steel strap 19. Flat steel bars 18 also secure the first end of each longitudinal bracing member 17 to its frame clamp 80. The second end of each longitudinal bracing member 17 is secured to support stand 30 by strap 19. Straps 18, 19 are preferably manufactured from an A.S.M.E. #1020 steel and secured to their respective bracing members 14, 15 by welding or other well known techniques. Straps 18 and 19 are bolted to their respective support stands 30 and frame clamps 80. When strap 19 is used in a longitudinal bracing arrangement, it is secured to its support stand 30 by a bolt 75 welded to a base plate 72. When used with a cross bracing arrangement, strap 19 is secured to base plate 72 by a fastener 74 that mounts the base plate 72 to the concrete foundation pad.

A second end of first brace member 14 is telescopically received within a second end of second brace member 15 so that the length of the braces can be varied with the placement of the support stands 30. Alternatively, the second end of the second brace member 15 can be telescopically received within the second end of the first brace member 14. When the braces 11 are extended between cooperating support stands 30 to a proper length, a bolt or pin 16 is inserted through a pair of openings 12 in each of the first and second brace members 14, 15 to set the braces at the proper length.

Each support stand 30 includes a clamping assembly 40, a head unit 45 and base 70. The base 70 includes base plate 72 and a plurality of fasteners 74 which secure the plate 72 to the concrete foundation pad 20. The fasteners 74 can include nuts and bolts, masonry screws or other similar fasteners.

The clamping assembly 40 positively locks the support stand 30 to the I-beams 90. The clamping assembly 40 includes a first plate 42 for receiving and supporting the underside of the I-beam 90 and a plurality of second plates 43 positioned on top of a portion 92 of the I-beam 90. Second plates 43 clamp the I-beam 90 to the support stand 30 using fasteners 41 secured to plate 42. In a preferred embodiment, the fasteners 41 include nuts and bolts, however, any conventional fastener for securing two plates together may be used. A plurality of spacing rods 44 are placed between the first plate 42 and each of the second plates 43, along the length of the first plate to keep the second plates 43 in a parallel, clamping relationship with the portion 92 of the I-beam 90. These rods 44 also space the plates 42, 43 from each other so that the clamping assembly can move along the I-beam 90 when the fasteners 41 are not completely tightened. Preferably, rods 44 have a circular cross section and are formed of an A.S.M.E. #1020 steel. However, any shaped rod or any material which can withstand the compression applied to it by plates 42, 43 and allow the clamp to move along the I-beam when the fasteners are not fully tightened can be used in place of the round, A.S.M.E. #1020 steel rods.

Figure 3:
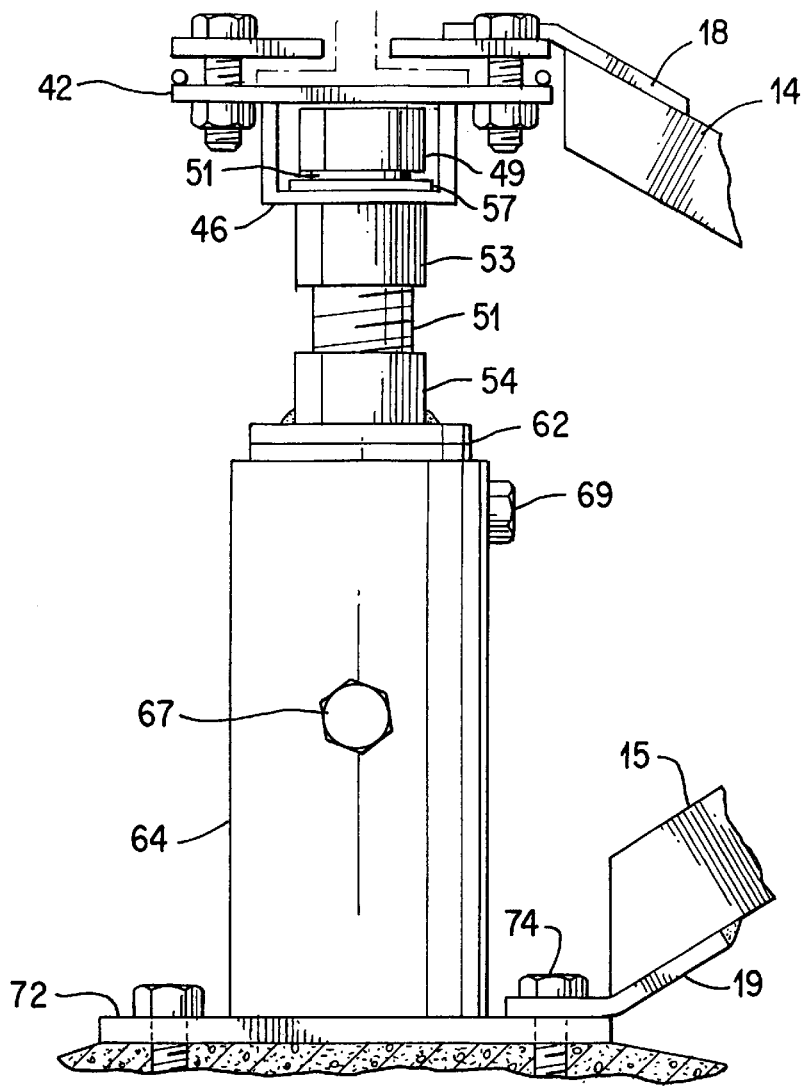
FIG. 3 is an elevational view of a support stand illustrating the tolerance between a first plate and a head unit in accordance with the present invention.

The head unit 45 is positioned below the clamp assembly 40 and attached thereto. The unit 45 includes a U-shaped channel member 46 secured to the underside of the first plate 42 for providing the plate 42 with a greater support surface area when compared to prior art building supports. In a preferred embodiment, the channel member 46 is welded to the first plate 42, however, other well known securing techniques may be used. The channel member 46 defines a space 47 between its inner bottom floor 48 and the underside of the first plate 42 which contains a support member 49, an end 52 of a threaded rod 51 and a bushing 57 The support member 49 is secured to the end 52 of the rod 51 and rotates with the rod on bushing 57 for ease of turning. Preferably, support member 49 is a threaded nut that is welded to the end of the threaded rod 51. As shown in FIG. 3, tolerance exists between support member 49 and the underside of first plate 42 before the I-beam 90 is fully loaded on the first plate 42 so that clamping assembly 40 can tilt slightly relative to support member 49, thereby facilitating the contact between the first plate 42 and the I-beam 90. When the I-beam 90 is properly positioned on first plate 42, support member 49 contacts first plate 42 and distributes the load of the building over the entire head unit 45 so the forces experienced by any one portion of the support stand 30 are lower when compared to conventional support stands. This distribution of the load extends the life of the support stand 30 and reduces its chance of failure.

A fine height adjusting mechanism 50 and a stepwise height adjusting mechanism 60 are provided between the clamping assembly 40 and the base 70 for leveling the building. These mechanisms 50, 60 vary the distance between the building and the foundation to compensate for uneven terrain or the movement of the foundation over time. The stepwise height adjustment mechanism 60 varies the height of the building in predetermined increments. Increments of approximately two to five inches are preferred, with the most preferred increment being approximately three inches. The fine height adjustment mechanism 50 varies the height of the building within the increments of the stepwise adjustment mechanism 60.

Fine height adjusting mechanism 50 includes the threaded rod 51, a tool engaging member 53 secured to rod 51 and a rod receiving member 54 operatively attached to base 70. The tool engaging member 53 supports the underside of the U-shaped channel member 46 and initially receives the load of the building frame when it is placed on the first plate 42, to prevent failure of the rod 51 and allow for the clearance discussed above between the underside of the first plate 42 and the support member 49. In a preferred embodiment, the tool engaging member 53 is a nut secured to the threaded rod 51 by welding or other known techniques. Gradual and fine adjustment of the building height relative to the foundation is accomplished by rotating rod 51 within a receiving member 54 using tool engaging member 53. The tool engaging member 53 receives a wrench or other such tool for rotating the rod 51. Receiving member 54 is preferably a threaded nut which fixed to an upper end 61 an inner tube 62 of the stepwise adjustment mechanism 60. The receiving member 54 could also be positioned within the inner tubular member 62.

Figure 6:
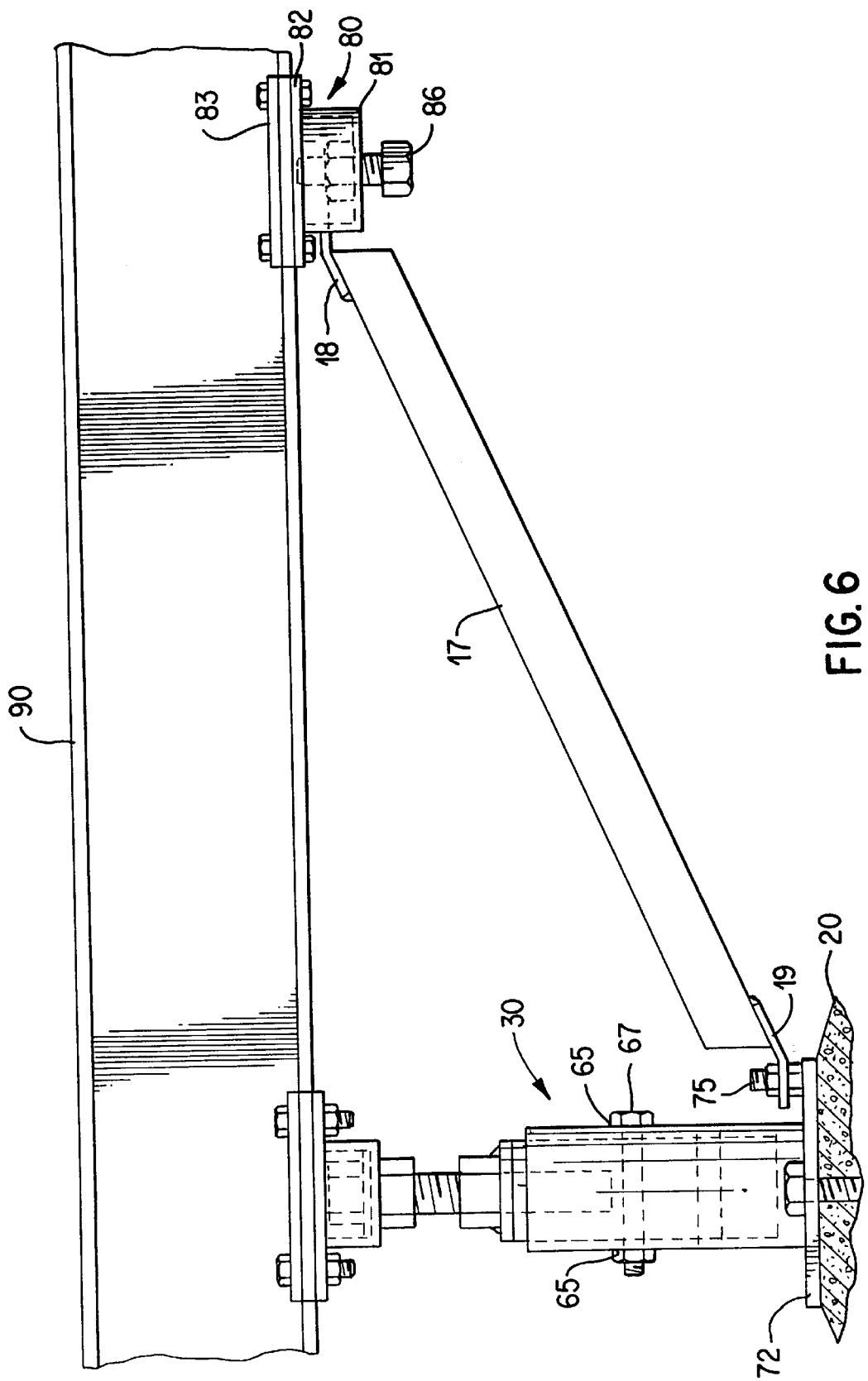
FIG. 6 is an elevational view of a support stand and frame clamp secured to an I-beam of a manufactured building.
Figure 7:
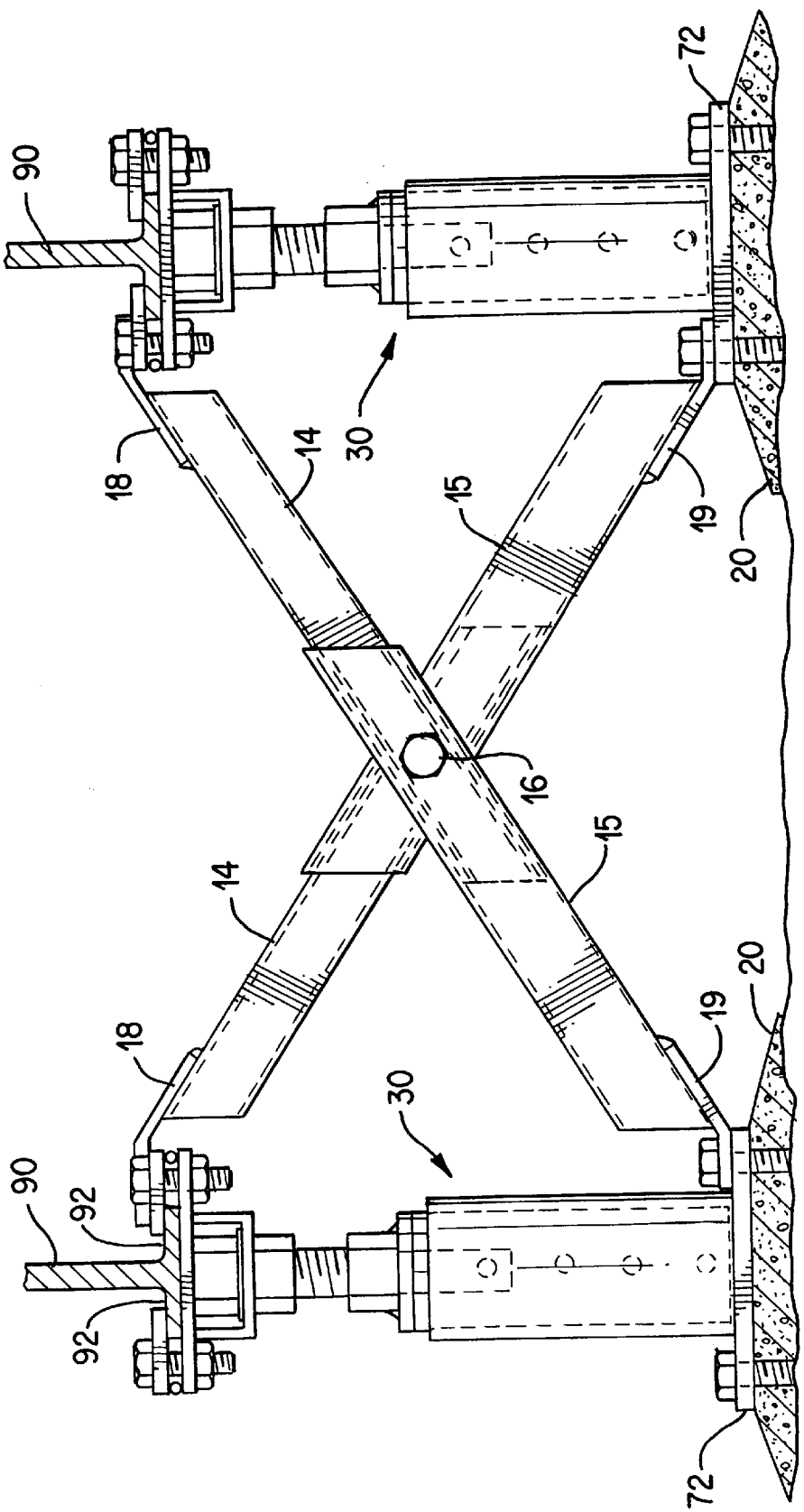
FIG. 7 is an elevational view of a pair of support stands secured to each other by cross braces and secured to the frame of a manufactured building.

The stepwise height adjusting mechanism 60 includes the inner telescopic tubular member 62 carrying the receiving member 54 and an outer tubular member 64 which telescopically receives inner tubular member 62. A plurality of apertures 63 are vertically spaced along opposite sides of the inner tubular member 62 at intervals which achieve the predetermined, incremental height adjustment discussed above. As seen in FIG. 6, a pair of apertures 65 are also located on opposite sides of the outer tubular member 64. A bayonet pin or bolt 67 is placed through the apertures 65 when they are properly aligned for a given height with a pair of the apertures 63 in the first tubular member 62. The outer tubular member 64 also includes an anti-rattle aperture 68. A bolt 69 is inserted through aperture 68 and frictionally engages the inner tubular member 62 to prevent it from rattling within the outer tubular member 64. It is also contemplated that the telescopic relationship between the tubular members 62, 64 could be reversed.

Figure 4:
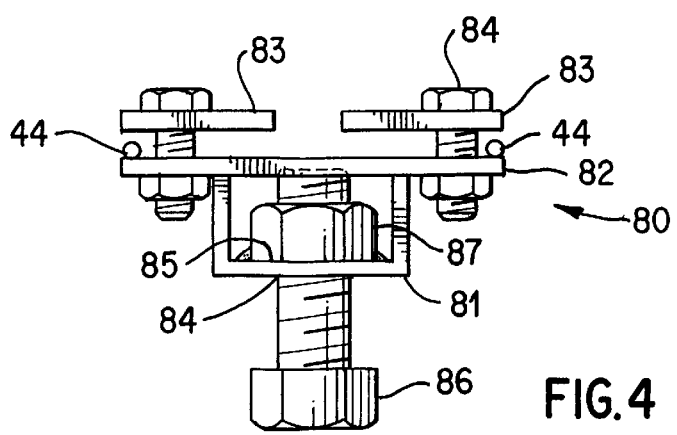
FIG. 4 is an elevational view of a frame clamp for a longitudinal brace according to the present invention.
Figure 5:
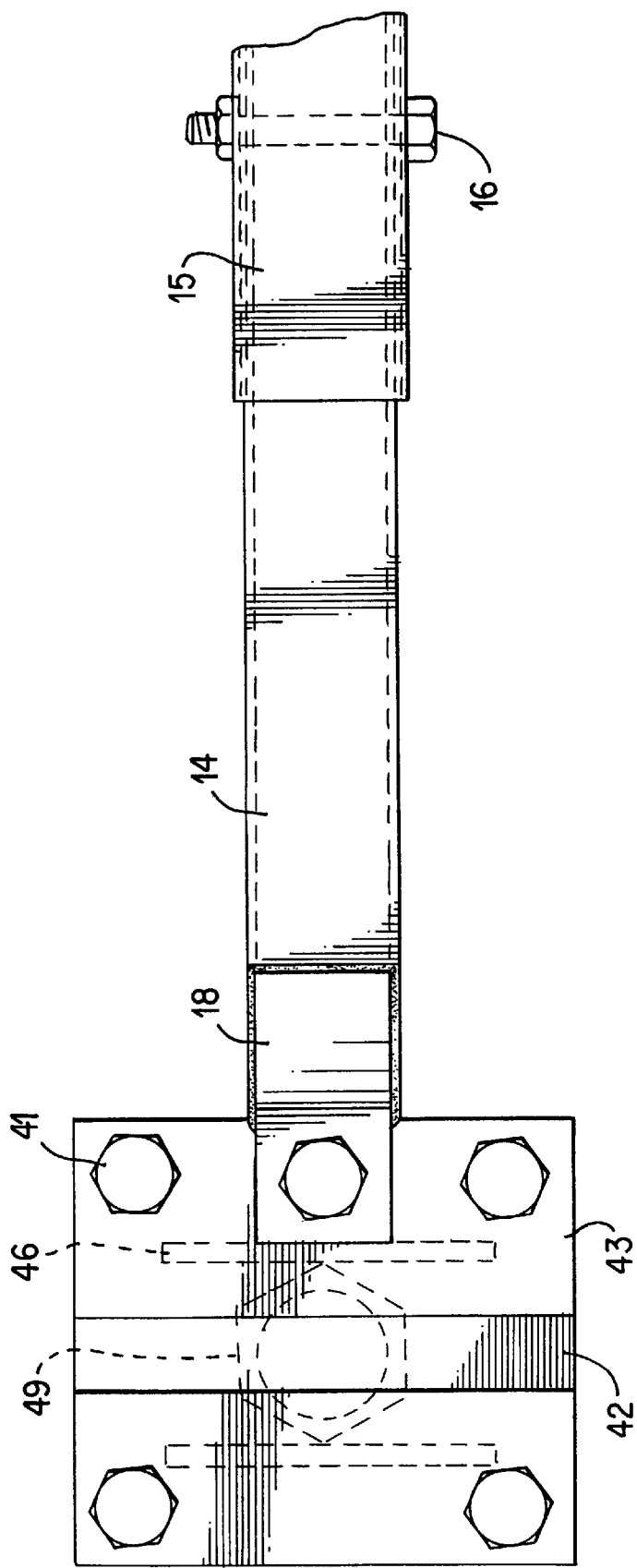
FIG. 5 is a top view of a support stand and brace according to the present invention.

As shown in FIG. 4, frame clamp 80 includes a U-shaped channel member 81 which is attached to a lower plate 82. A plurality of upper plates 83 are secured to lower plate 82 by fasteners 84 so that clamp 80 is secured to the foundation of the manufactured building. These plates 82, 83 lock the clamp 80 to the I-beam 90 in the same way as discussed above with respect to plates 42 and 43. Channel member 81 is secured to lower plate 82 in a conventional manner as discussed above with respect to channel member 46. Similar to channel member 46, channel member 81 includes a central aperture 84 in its bottom floor 85 for receiving a bolt 86. A nut 87 is positioned within channel member 81 for receiving bolt 86 and the strap 18 secured to the first end of longitudinal brace member 17. The longitudinal brace 17 is locked in place by embedding the terminal end of bolt 86 in lower plate 82. Spacing rods 44 may be used with clamp 80 as they are used with clamping assembly 40.

Different sized building frames can be accommodated by the present invention merely by changing the size of the clamping assembly 40. Numerous characteristics, advantages and embodiments of the invention have been described in detail in the foregoing description with reference to the accompanying drawings. However, the disclosure is illustrative only and the invention is not limited to the illustrated embodiments. Various changes and modifications may be effected therein by one skilled in the art without departing from the scope or spirit of the invention.

We claim:

1. A support system including a support stand for securing a manufactured building to a foundation, said support stand comprising:

a clamping assembly for receiving and supporting a frame of the manufactured building;

a channel member extending under said clamping assembly, said channel member including an inner floor;

a base for securing the support stand to the foundation;

a stepwise height adjusting mechanism for incrementally varying the height of the manufactured building relative to the foundation; and a fine height adjusting mechanism for varying the height of the manufactured building relative to the foundation within the increments of said stepwise height adjustment mechanism, said fine height adjustment mechanism comprising a threaded member having a first end located within said channel member; a support member located within said channel member between an underside of said clamping assembly and said inner floor of said channel member, said bushing supporting said clamping assembly; a bushing positioned between said support member and said inner floor of said channel member for spacing said support member above said channel member floor; a receiving member operatively attached to said base and receiving a second end of said threaded member; and a tool engaging member supporting an underside of said channel member and being secured to said threaded member said tool engageing member rotates said threaded member relative to said receiving member to adjust the height of the building.

2. The support stand of claim 1 wherein said stepwise height adjusting mechanism comprises a plurality of telescopic members including inner and outer members.

3. The support stand of claim 2 wherein one of said inner and outer telescopic members includes at least one sidewall having a plurality of apertures extending therethrough and said other telescopic member includes a pair of apertures that aligns with a pair of said apertures of said one telescopic member.

4. The support stand of claim 3 wherein said stepwise height adjusting mechanism further includes a locking member, said locking member extending through a plurality of said apertures in said one of said telescopic members and through said pair of apertures in said other telescopic member when the building is at a specific height above the foundation.

5. The support stand of claim 1 wherein said threaded member is a threaded rod; and said receiving member is a threaded nut which receives said threaded rod.

6. The support stand of claim 1 wherein said clamping assembly includes a support surface for receiving a portion of the frame of the manufactured building.

7. The support stand of claim 6 wherein said clamping assembly further includes at least one plate for positioning above the portion of the frame of the building to secure the frame to the support stand.

8. The support stand of claim 7 wherein said at least one plate includes a plurality of plates and each said plate is spaced from said support surface by a rod positioned between each said plate and said support surface.

9. The support stand of claim 6 wherein said support member allows said support surface to tilt relative to said fine height adjusting mechanism so that said support surface can fully contact the portion of the frame of the building when the support stand is in place.

10. The support stand of claim 1 wherein said support member is secured proximate said first end of said threaded member.

* * * * *